(12) United States Patent
Iizuka

(10) Patent No.: US 9,979,474 B2
(45) Date of Patent: May 22, 2018

(54) INFORMATION TRANSMISSION SYSTEM, SYMBOL STREAM GENERATING APPARATUS, SYMBOL STREAM DECODING APPARATUS, SYMBOL STREAM GENERATING METHOD, SYMBOL STREAM DECODING METHOD AND STORAGE MEDIUM

(71) Applicant: CASIO COMPUTER CO., LTD., Shibuya-ku, Tokyo (JP)

(72) Inventor: Nobuo Iizuka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 20 days.

(21) Appl. No.: 14/981,101

(22) Filed: Dec. 28, 2015

(65) Prior Publication Data

US 2016/0226587 A1    Aug. 4, 2016

(30) Foreign Application Priority Data

Jan. 30, 2015 (JP) ................................. 2015-016918
Mar. 10, 2015 (JP) ................................. 2015-047724

(51) Int. Cl.
    *H04B 10/11*     (2013.01)
    *H04B 10/116*    (2013.01)
(52) U.S. Cl.
    CPC ................................. *H04B 10/116* (2013.01)
(58) Field of Classification Search
    CPC .................................................. H04B 10/116
    (Continued)

(56) References Cited

U.S. PATENT DOCUMENTS 5,790,570 A * 8/1998 Heegard ............. H03M 13/251
                                                    375/262
8,390,482 B2 * 3/2013 Fukuda .................. H03M 5/20
                                                    341/56
(Continued)

FOREIGN PATENT DOCUMENTS

EP         2538584 A1    12/2012
JP      2013009074 A     1/2013
(Continued)

OTHER PUBLICATIONS

Extended European Search Report dated Jun. 8, 2016, issued in counterpart European Application No. 15202421.2.
(Continued)

*Primary Examiner* — Ken N Vanderpuye
*Assistant Examiner* — Dibson Sanchez
(74) *Attorney, Agent, or Firm* — Holtz, Holtz & Volek PC

(57) ABSTRACT

An information transmission system includes a transmission apparatus and a reception apparatus and uses visible lights as transmission media. The transmission apparatus includes a generating unit and a first replace unit. The generating unit generates a multi-value symbol stream. The first replace unit replaces the multi-value symbol stream generated by the generating unit to a discontinuous symbol stream. The discontinuous symbol stream is a symbol stream without a sequence of identical symbol values. The number of identical symbol values in the sequence is equal to or greater than a predetermined number. The reception apparatus includes an acquiring unit and a second replace unit. The acquiring unit acquires the discontinuous symbol stream. The second replace unit replaces the discontinuous symbol stream acquired by the acquiring unit to the multi-value symbol stream according to a predetermined rule.

9 Claims, 9 Drawing Sheets

(58) Field of Classification Search
USPC .................................................. 398/118–131
See application file for complete search history.

(56) References Cited

U.S. PATENT DOCUMENTS

| | | | | |
|---|---|---|---|---|
| 2001/0028684 | A1* | 10/2001 | Chung | H04L 1/0041 375/261 |
| 2002/0034253 | A1* | 3/2002 | Nagai | H04N 21/4348 375/240.25 |
| 2002/0042899 | A1* | 4/2002 | Tzannes | H03M 13/118 714/786 |
| 2005/0149822 | A1* | 7/2005 | Lee | H04L 1/0009 714/758 |
| 2006/0239689 | A1* | 10/2006 | Ashdown | H04B 10/1141 398/130 |
| 2006/0275041 | A1* | 12/2006 | Kitaji | H03D 9/00 398/182 |
| 2008/0065971 | A1* | 3/2008 | Betts | H03M 13/2707 714/800 |
| 2008/0166135 | A1 | 7/2008 | Ann | |
| 2009/0010654 | A1* | 1/2009 | Shin | H04B 10/1143 398/135 |
| 2009/0129484 | A1* | 5/2009 | He | H03M 13/253 375/240.26 |
| 2009/0135946 | A1* | 5/2009 | Dowling | H04L 25/03203 375/286 |
| 2010/0135673 | A1* | 6/2010 | Son | H04B 10/1141 398/183 |
| 2010/0316389 | A1* | 12/2010 | Walewski | H04B 10/1141 398/130 |
| 2011/0069965 | A1* | 3/2011 | Kim | H04B 10/1149 398/130 |
| 2011/0102208 | A1* | 5/2011 | Terashima | H03M 5/20 341/67 |
| 2011/0135317 | A1* | 6/2011 | Chaplin | H04B 10/1149 398/172 |
| 2011/0154155 | A1* | 6/2011 | Abu-Surra | H03M 5/145 714/756 |
| 2011/0164881 | A1* | 7/2011 | Rajagopal | H04B 10/1149 398/128 |
| 2012/0087676 | A1* | 4/2012 | Lim | H04B 10/116 398/182 |
| 2012/0230703 | A1 | 9/2012 | Yamada et al. | |
| 2012/0257901 | A1* | 10/2012 | Yamada | H04B 10/114 398/130 |
| 2012/0324320 | A1* | 12/2012 | Terabe | H04L 1/0061 375/295 |
| 2012/0328302 | A1 | 12/2012 | Iizuka et al. | |
| 2013/0202310 | A1* | 8/2013 | Rietman | H04B 10/116 398/128 |
| 2013/0294505 | A1* | 11/2013 | Kirenko | H04N 19/00006 375/240.02 |
| 2014/0010540 | A1* | 1/2014 | Jeong | H04B 10/116 398/66 |
| 2014/0178080 | A1* | 6/2014 | Chen | H04B 10/116 398/172 |
| 2014/0193162 | A1 | 7/2014 | Iizuka et al. | |
| 2015/0023673 | A1 | 1/2015 | Iizuka et al. | |
| 2015/0104184 | A1* | 4/2015 | Jeffrey | H04B 10/116 398/130 |
| 2015/0147069 | A1* | 5/2015 | Brandt-Pearce | H04L 25/4902 398/186 |
| 2016/0028477 | A1* | 1/2016 | Jovicic | H04B 10/116 398/118 |

FOREIGN PATENT DOCUMENTS

| | | |
|---|---|---|
| JP | 2013098655 A | 5/2013 |
| JP | 2014168137 A | 9/2014 |

OTHER PUBLICATIONS

Japanese Office Action (and English translation thereof) dated Jul. 4, 2017 issued in counterpart Japanese Application No. 2015-047724.

* cited by examiner

*FIG. 6*

| INDEX | REPLACE RULE SYMBOL |
|---|---|
| 0 | 00 |
| 1 | 01 |
| 2 | 02 |
| 3 | 10 |
| 4 | 11 |
| 5 | 12 |
| 6 | 20 |
| 7 | 21 |
| 8 | 22 |

FIG. 7

| INDEX | SYMBOL SEQUENCE |
|---|---|
| 0 | SAME SYMBOL VALUES ARE INCLUDED AS ZEROTH TO SECOND DIGITS |
| 1 | SAME SYMBOL VALUES ARE INCLUDED AS FIRST TO THIRD DIGITS |
| 2 | SAME SYMBOL VALUES ARE INCLUDED AS SECOND TO FOURTH DIGITS |
| 3 | SAME SYMBOL VALUES ARE INCLUDED AS THIRD TO FIFTH DIGITS |
| 4 | SAME SYMBOL VALUES ARE INCLUDED AS ZEROTH TO SECOND DIGITS AND AS THIRD TO FIFTH DIGITS |
| 5 | SYMBOL VALUES OF AABB PATTERN ARE INCLUDED AS ZEROTH TO THIRD DIGITS |
| 6 | SYMBOL VALUES OF AABB PATTERN ARE INCLUDED AS FIRST TO FOURTH DIGITS |
| 7 | SYMBOL VALUES OF AABB PATTERN ARE INCLUDED AS SECOND TO FIFTH DIGITS |
| 8 | THE OTHERS (REPLACE IS NOT PERFORMED) |

FIG. 8

| INDEX | CONTENT OF REPLACE RULE |
|---|---|
| 0 ~ 4 | AAA→ABC |
| 5 ~ 7 | AABB→ABCB OR ACBC |

FIG. 10

| 8-BIT INFORMATION | 6-DIGIT SYMBOL STREAM | 8-BIT INFORMATION | 6-DIGIT SYMBOL STREAM | 8-BIT INFORMATION | 6-DIGIT SYMBOL STREAM | 8-BIT INFORMATION | 6-DIGIT SYMBOL STREAM |
|---|---|---|---|---|---|---|---|
| 00 | 210021 | 10 | 202110 | 20 | 001221 | 30 | 210012 |
| 01 | 021210 | 11 | 220101 | 21 | 112002 | 31 | 021120 |
| 02 | 210210 | 12 | 202101 | 22 | 221021 | 32 | 210120 |
| 03 | 102210 | 13 | 022101 | 23 | 221012 | 33 | 102120 |
| 04 | 102021 | 14 | 022110 | 24 | 002012 | 34 | 102012 |
| 05 | 021102 | 15 | 220011 | 25 | 002021 | 35 | 021201 |
| 06 | 210102 | 16 | 202011 | 26 | 001002 | 36 | 210201 |
| 07 | 102102 | 17 | 022011 | 27 | 112211 | 37 | 102201 |
| 08 | 120021 | 18 | 021021 | 28 | 101220 | 38 | 120012 |
| 09 | 012210 | 19 | 021012 | 29 | 110202 | 39 | 012120 |
| 0A | 120210 | 1A | 021221 | 2A | 101202 | 3A | 120120 |
| 0B | 201210 | 1B | 021002 | 2B | 011202 | 3B | 201120 |
| 0C | 201021 | 1C | 012002 | 2C | 011220 | 3C | 201012 |
| 0D | 012102 | 1D | 012211 | 2D | 110022 | 3D | 012201 |
| 0E | 120102 | 1E | 012012 | 2E | 101022 | 3E | 120201 |
| 0F | 201102 | 1F | 012021 | 2F | 011022 | 3F | 201201 |

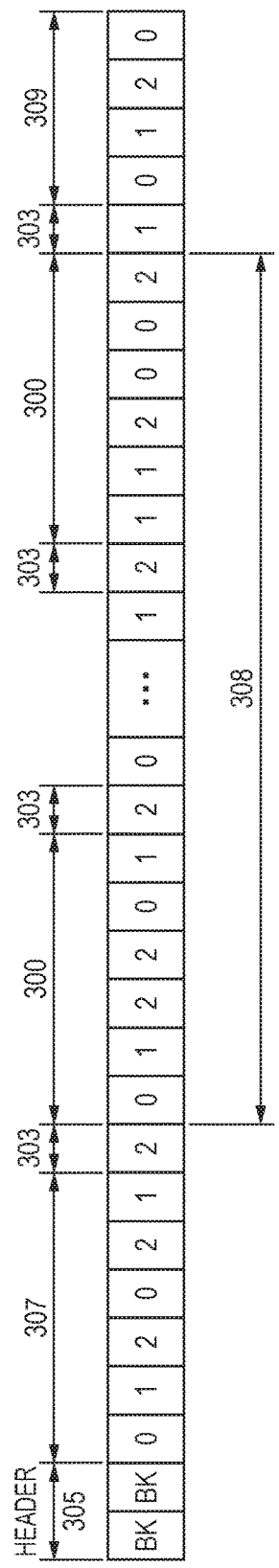

INFORMATION TRANSMISSION SYSTEM, SYMBOL STREAM GENERATING APPARATUS, SYMBOL STREAM DECODING APPARATUS, SYMBOL STREAM GENERATING METHOD, SYMBOL STREAM DECODING METHOD AND STORAGE MEDIUM

CROSS-REFERENCE TO RELATED APPLICATIONS

This application is based upon and claims the benefit of priority from the prior Japanese Patent Application Nos. 2015-016918, filed on Jan. 30, 2015 and 2015-047724, filed on Mar. 10, 2015, and the entire contents of which are incorporated herein by reference.

BACKGROUND OF THE INVENTION

1. Field of the Invention

The present invention relates to an information transmission system, a symbol stream generating apparatus, a symbol stream decoding apparatus, a symbol stream generating method, a symbol stream decoding method and a storage medium using visible lights as transmission media.

2. Description of the Related Art

There is an information transmission system in which the transmission side emits lights having colors (wavelength bands) according to transmission object information and the reception side receives the lights and decodes the lights into the information as disclosed in JP-A-2014-168137.

In this information transmission system, for example, the transmission side outputs while changing lights of red (R), green (G), and blue (B) which are basic colors according to individual symbol values constituting a symbol stream. Meanwhile, the reception side performs imaging, thereby acquiring images, and specifies portions of the images where color changes are drastic, as candidates for a signal source of the transmission side, and decodes the symbol stream into information based on those color changes.

SUMMARY OF THE INVENTION

According to the present invention, an information transmission system uses visible lights as transmission media. The information system includes a transmission apparatus and a reception apparatus. The transmission apparatus includes a generating unit and a first replace unit. The generating unit generates a multi-value symbol stream by using visible lights as transmission media. The first replace unit replaces the multi-value symbol stream generated by the generating unit to a discontinuous symbol stream. The discontinuous symbol stream is a symbol stream without a sequence of identical symbol values. The number of identical symbol values in the sequence is equal to or greater than a predetermined number. The reception apparatus includes an acquiring unit and a second replace unit. The acquiring unit acquires the discontinuous symbol stream. The second replace unit replaces the discontinuous symbol stream acquired by the acquiring unit to the multi-value symbol stream according to a predetermined rule.

Further, a symbol stream generating apparatus includes a generating unit and a replace unit. The generating unit generates a multi-value symbol stream to be transmitted by using visible lights as transmission media. The replace unit replaces the multi-value symbol stream generated by the generating unit to a discontinuous symbol stream. The discontinuous symbol stream is a symbol stream without a sequence of identical symbol values. The number of identical symbol values in the sequence is equal to or greater than a predetermined number.

Further, a symbol stream decoding apparatus includes an acquiring unit and a replace unit. The acquiring unit acquires a discontinuous symbol stream transmitted by using visible lights as transmission media. The discontinuous symbol stream is a symbol stream without a sequence of identical symbol values. The number of identical symbol values in the sequence is equal to or greater than a predetermined number. The replace unit replaces the discontinuous symbol stream acquired by the acquiring unit to a multi-value symbol stream according to a predetermined rule.

A symbol stream generating method according to the present invention includes: generating a multi-value symbol stream to be transmitted by using visible lights as transmission media; and replacing the generated multi-value symbol stream to a discontinuous symbol stream, the discontinuous symbol stream being a symbol stream without a sequence of identical symbol values, the number of identical symbol values in the sequence being equal to or greater than a predetermined number.

A symbol stream decoding method according to the present invention includes: acquiring a discontinuous symbol stream transmitted by using visible lights as transmission media, the discontinuous symbol stream being a symbol stream without a sequence of identical symbol values, the number of identical symbol values in the sequence being equal to or greater than a predetermined number; and replacing the acquired discontinuous symbol stream to a multi-value symbol stream according to a predetermined rule.

A non-transitory computer readable storage medium according to the present invention stores a program for controlling a computer to perform following processes including: generating a multi-value symbol stream to be transmitted by using visible lights as transmission media; and replacing the generated multi-value symbol stream to a discontinuous symbol stream, the discontinuous symbol stream being a symbol stream without a sequence of identical symbol values, the number of identical symbol values in the sequence being equal to or greater than a predetermined number.

A non-transitory computer readable storage medium according to the present invention stores a program for controlling a computer to perform following processes including: acquiring a discontinuous symbol stream transmitted by using visible lights as transmission media, the discontinuous symbol stream being a symbol stream without a sequence of identical symbol values, the number of identical symbol values in the sequence being equal to or greater than a predetermined number; and replacing the acquired discontinuous symbol stream to a multi-value symbol stream according to a predetermined rule.

BRIEF DESCRIPTION OF THE DRAWINGS

FIG. 6 is a view illustrating an example of a replace rule table.

FIG. 7 is a view illustrating examples of symbol sequences to which replace rules apply.

FIG. 8 is a view illustrating examples of the contents of the replace rules.

FIG. 10 is a view illustrating an example of a symbol stream conversion table.

FIG. 11A is a view illustrating a transmission symbol format.

FIG. 11B is a view illustrating an example of a light emission mode according to the transmission symbol format shown in FIG. 11A.

DETAILED DESCRIPTION OF THE PREFERRED EMBODIMENT

Figure 1:
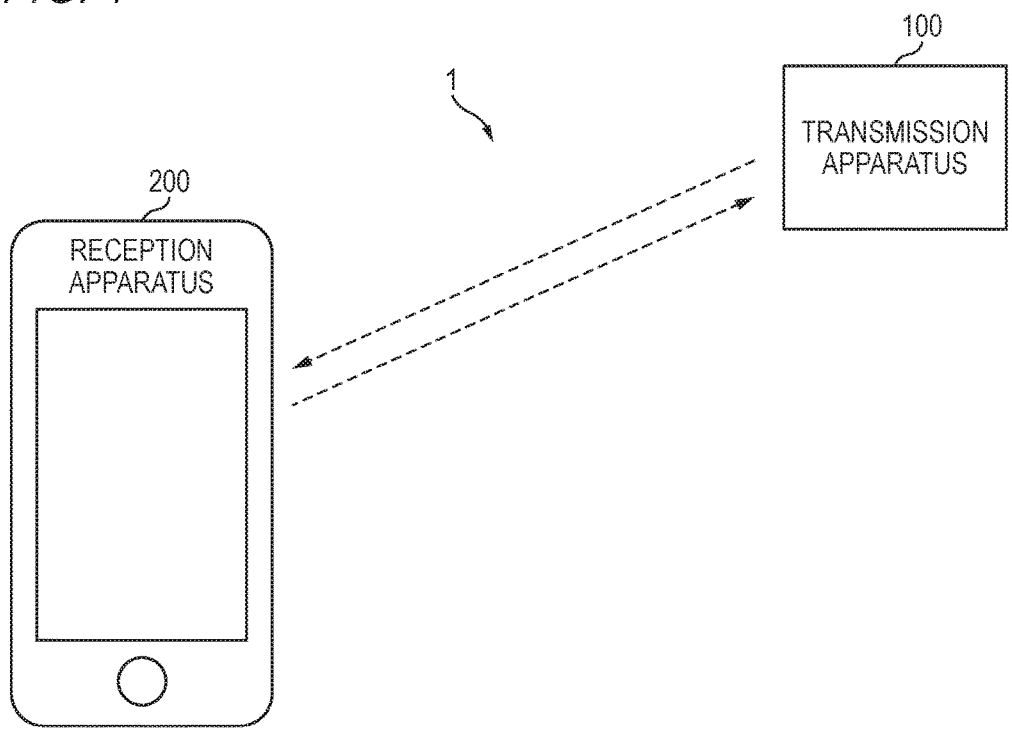
FIG. 1 is a view illustrating the configuration of an information transmission system.

Hereinafter, an information transmission system according to a first embodiment of the present invention will be described. An information transmission system 1 according to the first embodiment is configured so as to include a transmission apparatus 100 and a reception apparatus 200 as shown in FIG. 1.

In the information transmission system 1, the transmission apparatus 100 and the reception apparatus 200 are configured such that it is possible to perform communication from the transmission apparatus 100 to the reception apparatus 200 using lights (visible lights) as transmission media.

The transmission apparatus 100 generates a symbol stream having digits each of which is composed of one of symbols of three values "0", "1", and "2" based on a ternary numeral system, based on transmission object information, and performing modulation, thereby converting the symbol stream into a light signal in which red (R), green (G), and blue (B) lights in the wavelength bands of visible lights corresponding to symbol values change in time series, and outputs the light signal. In the first embodiment, a symbol value "0", a symbol value "1", and a symbol value "2" are converted into red (R), green (G), and blue (B) lights, respectively.

The reception apparatus 200 is an information apparatus having an imaging (light receiving) function, such as a smart phone, and images the transmission apparatus 100 included in an imaging range, thereby receiving the light signal from the transmission apparatus 100. Also, the reception apparatus 200 displays an image acquired by imaging. Further, the reception apparatus 200 decodes the received light signal into a symbol stream, and displays the information represented by the symbol stream.

Figure 2:
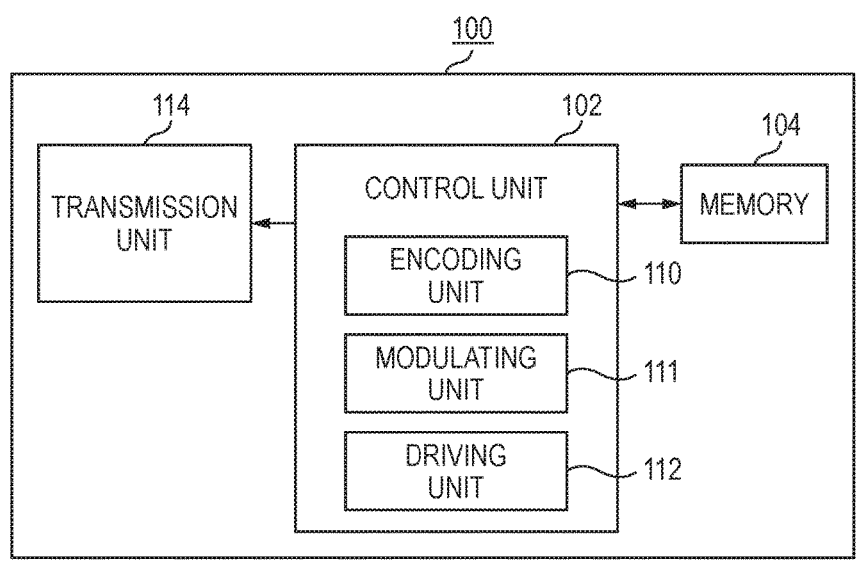
FIG. 2 is a view illustrating the configuration of a transmission apparatus shown in FIG. 1.

Now, the transmission apparatus 100 will be described. The transmission apparatus 100 is configured so as to include a control unit 102, a memory 104, and a transmission unit 114 as shown in FIG. 2.

The control unit 102 includes a central processing unit (CPU), and serves to perform software processing according to programs stored in the memory 104, thereby implementing various functions of the transmission apparatus 100.

Examples of the memory 104 include a random access memory (RAM) which serves as a work area, and a read only memory (ROM) which stores basic operation programs. The memory 104 stores a variety of information (such as programs) which can be used for controlling and the like in the transmission apparatus 100.

The control unit 102 includes an encoding unit 110, which corresponds to a generating unit, a first determining unit, and a first replace unit. The encoding unit 110 divides transmission object information into units of one block, and coverts each block into a symbol stream (a symbol stream corresponding to one block of the transmission object information) 300 having six digits each of which is composed of one of the symbols of three values "0", "1", and "2" based on the ternary numeral system.

Further, in a case where a symbol stream 300 includes a pattern which is a sequence of three or more identical symbol values (hereinafter, referred to as an AAA pattern) (a case where a symbol stream corresponding to one block of the transmission object information is a continuous symbol stream), the encoding unit 110 converts the symbols of the AAA pattern into symbols of a pattern which does not include any sequence of three or more identical symbol values, based on a predetermined replace rule, thereby generating a discontinuous symbol stream 301 having six digits. Also, in a case where a symbol stream corresponding to one block of the transmission object information includes a pattern which is a sequence of two patterns each of which is a sequence of two identical symbol values (hereinafter, referred to as an AABB pattern) (a case where a symbol stream having six digits is a continuous symbol stream), the encoding unit 110 converts the symbols of the AABB pattern into symbols of a pattern other than the AABB pattern, based on a predetermined replace rule, thereby generating a discontinuous symbol stream 301 having six digits. Further, the encoding unit 110 adds a replace rule symbol 302 which is a symbol representing a replace rule, a discontinuity guarantee symbol 303 for guaranteeing discontinuity of a symbol stream, a parity symbol 304, and a header 305, thereby generating a transmission symbol stream 306. The details of transmission symbol stream generation will be described below.

A modulating unit 111 performs modulation based on each transmission symbol stream, thereby associating symbol values "0", symbol values "1", and symbol values "2" with red (R), green (G), and blue (B) lights, respectively. The driving unit 112 performs control such that the red (R), green (G), and blue (B) lights associated with the symbol values are changed over time.

The transmission unit 114 is, for example, light emitting diodes (LEDs), and is controlled by the driving unit 112 such that it outputs while changing the red (R), green (G), and blue (B) lights over time.

Figure 3:
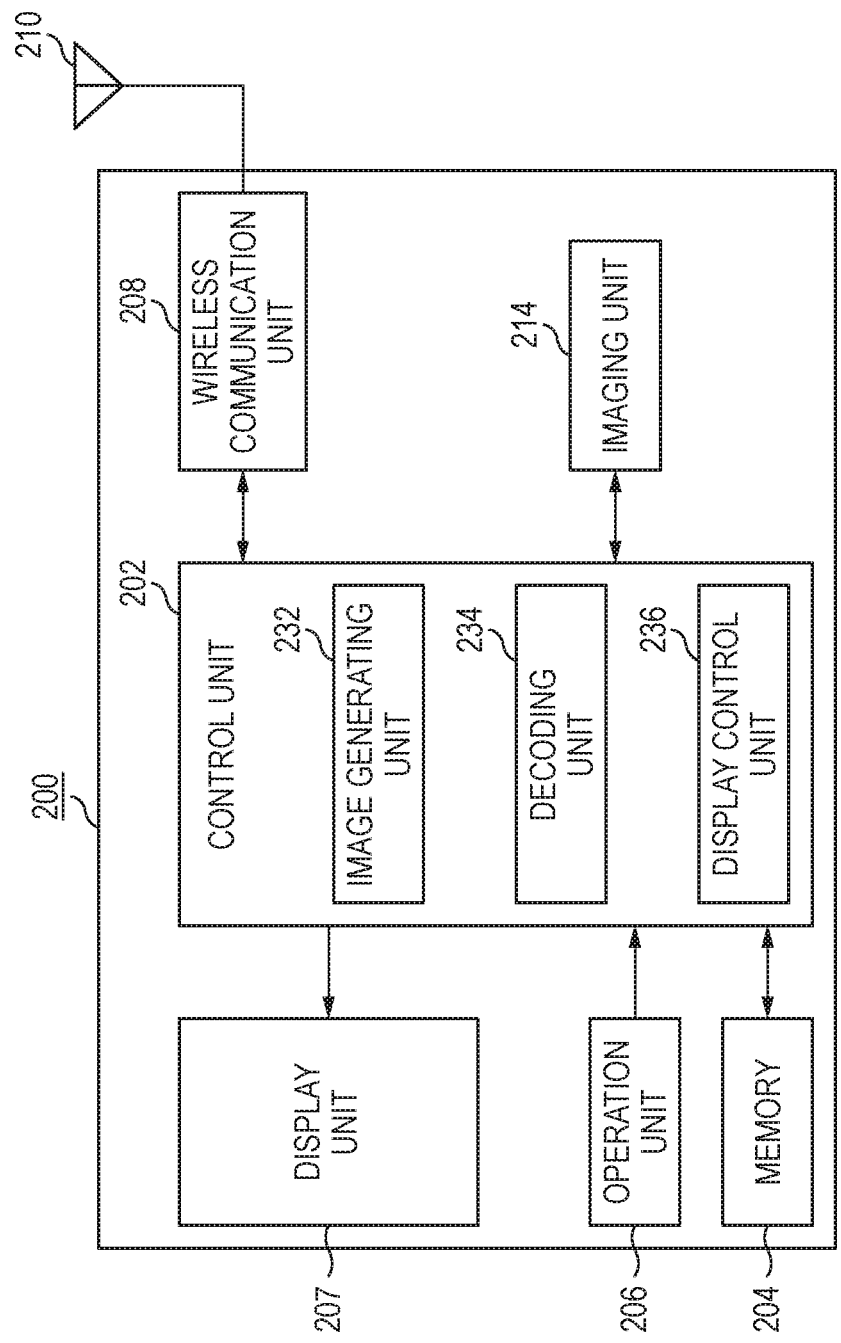
FIG. 3 is a view illustrating the configuration of a reception apparatus shown in FIG. 1.

Now, the reception apparatus 200 will be described. The reception apparatus 200 displays taken images, and serves as a communication device for receiving information from the transmission apparatus 100. The reception apparatus 200 is configured so as to include a control unit 202, a memory 204, an operation unit 206, a display unit 207, a wireless communication unit 208, an antenna 210, and an imaging unit 214 as shown in FIG. 3.

The control unit 202 is configured by a CPU. The control unit 202 serves to perform software processing according to programs stored in the memory 204, thereby implementing various functions of the reception apparatus 200.

Examples of the memory 204 include a RAM and a ROM. The memory 204 stores a variety of information (such as programs) which can be used for controlling and the like in the reception apparatus 200.

The operation unit 206 is a touch panel which is disposed on the top surface of a display area of the display unit 207, and is an interface which can be used for inputting the content of a user's operation. The display unit 207 is configured by, for example, a liquid crystal display (LCD), a plasma display panel (PDP), or an electro-luminescence (EL) display, and displays images.

The wireless communication unit 208 is configured using, for example, a radio frequency (RF) circuit and a base band (BB) circuit. The wireless communication unit 208 performs transmission and reception of wireless signals through the antenna 210. Also, the wireless communication unit 208 modulates transmission signals and demodulates reception signals.

The imaging unit 214 is disposed on the opposite surface of the housing of the reception apparatus 200 to the surface where the display unit 207 is installed. The imaging unit 214 is configured by a lens and a light receiving device. The lens is composed of a zoom lens, and moves according to zoom control and focusing control of the control unit 202. The angle of imaging view and optical image of the imaging unit 214 are controlled by movement of the lens. The light receiving device is configured by a plurality of light receiving elements arranged two-dimensionally and regularly on a light receiving surface. The light receiving device is an imaging device such as a photodiode, a charge coupled device (CCD), or a complementary metal oxide semiconductor (CMOS). The imaging unit 214 takes optical images (receives incident lights) with an angle of imaging view of a predetermined range based on a control signal from the control unit 202, and sequentially outputs image signals included in the angle of imaging view, to the control unit 202.

Whenever an image signal is input from the imaging unit 214, an image generating unit 232 included in the control unit 202 converts the corresponding image signal into digital data, thereby generating a frame.

The control unit 202 includes a decoding unit 234, which corresponds to an acquiring unit, a second determining unit, and a second replace unit. The decoding unit 234 searches frames input continuously in time series for portions (change areas) where hue changes occur. Specifically, the decoding unit 234 determines the lightness value of each pixel included in the image data of the frames. Further, the decoding unit 234 considers pixels having lightness values equal to or larger than a predetermined value as candidates (candidate areas) for portions (change areas) where hue changes occur due to reception of lights from the transmission unit 114 of the transmission apparatus 100. Furthermore, the decoding unit 234 determines the color of coordinates of each candidate area common to of a predetermined number of acquired latest frames. As a result of the determination, in a case where the hue value significantly changes in a predetermined pattern, like a case where the hue value of coordinates in a candidate area is a first predetermined value in a certain frame, and is a second predetermined value in any other frame, the decoding unit 234 considers the corresponding candidate area as a change area. Each change area is an area to be a candidate for the transmission unit 114 of the transmission apparatus 100, that is, a signal source.

In a case where there is any change area, thereafter, whenever imaging is performed, the decoding unit 234 acquires the hue value of each change area included in a frame, and determines which of red (R), green (G), and blue (B) is the color of the change area corresponding to the acquired hue value. Further, the decoding unit 234 generates symbols corresponding to the determined red (R), green (G), and blue (B), and generates a transmission symbol stream which is a set of those symbols.

Subsequently, the decoding unit 234 determines a replace rule based on a replace rule symbol included in the transmission symbol stream. Further, the decoding unit 234 determines whether the symbols have been obtained by replace based on the determined replace rule. In a case where the symbols have been obtained by replace, the decoding unit 234 performs inverse conversion on the symbols based on the determined replace rule, thereby acquiring a 6-digit symbol stream before the conversion of the transmission apparatus 100 (a symbol stream corresponding to one block of the transmission object information). The details of 6-digit symbol stream acquisition will be described below.

Further, from the symbol stream corresponding to one block of the transmission object information, the decoding unit 234 acquires transmission object information corresponding to one block. The image generating unit 232 generates an image of the transmission object information acquired by the decoding unit 234. A display control unit 236 included in the control unit 202 performs control such that the display unit 207 displays the image of the transmission object information.

Now, operations of the information transmission system 1 according to the first embodiment will be described. In the information transmission system 1, the transmission apparatus 100 performs a transmitting process, and the reception apparatus 200 performs a receiving process.

Figure 4:
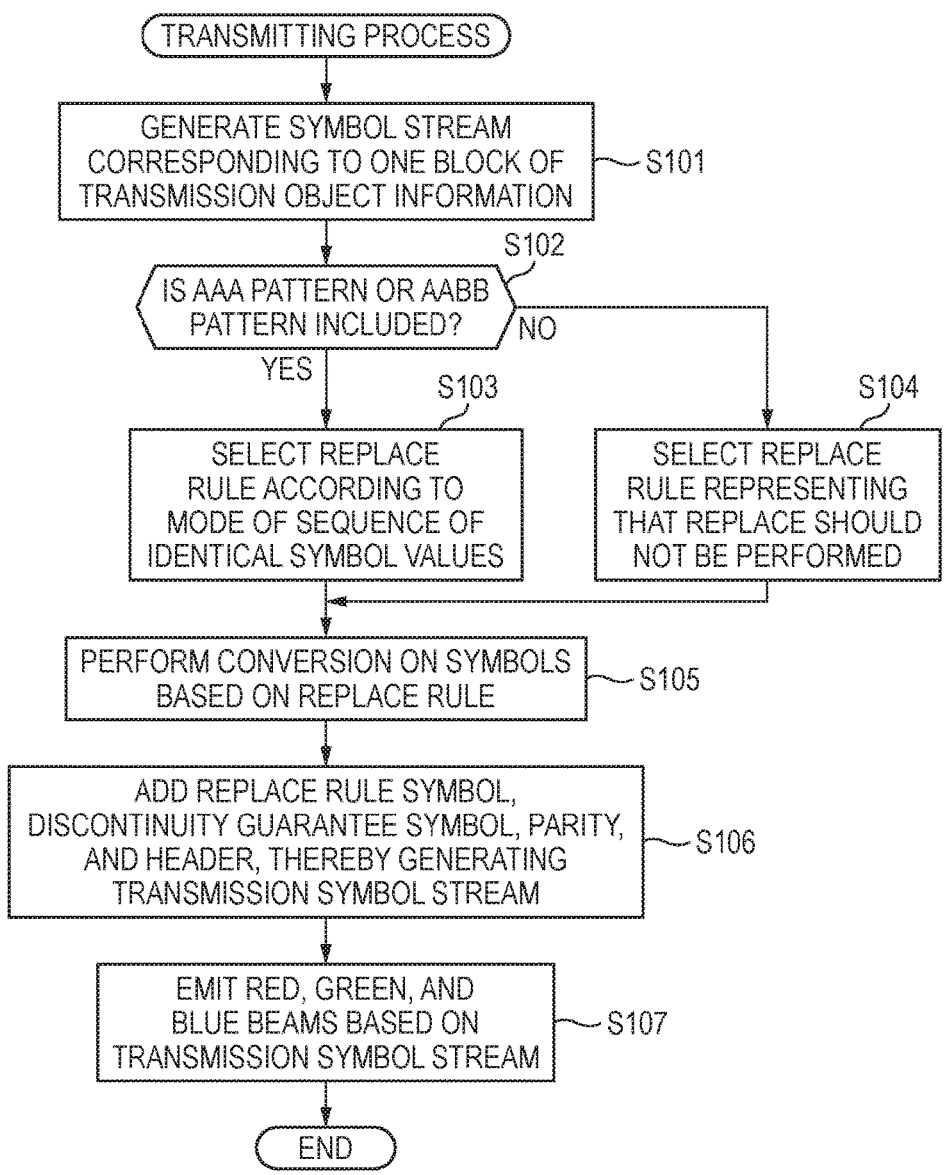
FIG. 4 is a flow chart illustrating operations of a transmitting process of the transmission apparatus.

FIG. 4 is a flow chart illustrating operations of the transmitting process of the transmission apparatus 100. In STEP S101, the encoding unit 110 included in the control unit 102 divides transmission object information into units of one block, and coverts each block into a symbol stream (a symbol stream corresponding to one block of the transmission object information) 300 having six digits each of which is composed of one of the symbols of three values "0", "1", and "2" based on the ternary numeral system. By the process of the STEP S101, a symbol stream 300 which corresponds to one block of the transmission object information and is a 6-digit symbol stream having zeroth to fifth digits is generated.

Subsequently, in STEP S102, the encoding unit 110 determines whether the symbol stream corresponding to one block of the transmission object information includes an AAA pattern or an AABB pattern, or not. Specifically, the encoding unit 110 determines whether the symbol stream corresponding to one block of the transmission object information includes any one of AAA patterns "000", "111", and "222" and AABB patterns "0011", "0022", "1100", "1122", "2200", and "2211". By the way, for example, in a case where the symbol stream corresponding to one block of the transmission object information is "000011", "001111", "11111", or the like, both of an AAA pattern and an AABB pattern are included. In this case, in the first embodiment, it is determined that the symbol stream includes an AAA pattern.

In a case where the symbol stream corresponding to one block of the transmission object information includes an AAA pattern or an AABB pattern ("YES" in STEP S102), in STEP S103, the encoding unit 110 selects a replace rule according to the mode of a sequence of identical symbol values.

FIG. 6 is a view illustrating an example of a replace rule table including a plurality of replace rules. FIG. 7 is a view illustrating examples of symbol sequences to which the replace rules apply. Also, information on the replace rule table shown in FIG. 6 and information on the symbol sequences which are shown in FIG. 7 and to which the replace rules apply are stored in the memory included in the transmission apparatus 100 and the memory 204 included in the reception apparatus 200.

As shown in FIG. 6, there are nine replace rules having indexes "0" to "8", and each index is associated with a replace rule symbol (a replace rule information item) 302 having two digits each of which is composed of one of the symbols of three values "0", "1", and "2" based on the ternary numeral system. The replace rule table is stored in the memory included in the transmission apparatus 100 and the memory 204 included in the reception apparatus 200.

Also, as shown in FIGS. 6 and 7, in a case where the symbol stream corresponding to one block of the transmission object information includes identical symbol values as the zeroth to second digits, in order to perform replace on the symbol values of the zeroth to second digits, the replace rule of the index "0" is applied, and a replace rule symbol 302 corresponding to the index "0" is "00".

In a case where the symbol stream corresponding to one block of the transmission object information includes identical symbol values as first to third digits, in order to perform replace on the symbol values of the first to third digits, the replace rule of the index "1" is applied, and a replace rule symbol 302 corresponding to the index "1" is "01".

In a case where the symbol stream corresponding to one block of the transmission object information includes identical symbol values as second to fourth digits, in order to perform replace on the symbol values of the second to fourth digits, the replace rule of the index "2" is applied, and a replace rule symbol 302 corresponding to the index "2" is "02".

In a case where the symbol stream corresponding to one block of the transmission object information includes identical symbol values as third to fifth digits, in order to perform replace on the symbol values of the third to fifth digits, the replace rule of the index "3" is applied, and a replace rule symbol 302 corresponding to the index "3" is "10".

In a case where the symbol stream corresponding to one block of the transmission object information includes identical symbol values as zeroth to second digits and includes identical symbol values as third to fifth digits, in order to perform replace on the symbol values of the zeroth to second digits and the third to fifth digits, the replace rule of the index "4" is applied, and a replace rule symbol 302 corresponding to the index "4" is "11".

In a case where the symbol stream corresponding to one block of the transmission object information includes symbol values of an AABB pattern as zeroth to third digits, in order to perform replace on the symbol values of the zeroth to third digits, the replace rule of the index "5" is applied, and a replace rule symbol 302 corresponding to the index "5" is "12".

In a case where the symbol stream corresponding to one block of the transmission object information includes symbol values of an AABB pattern as first to fourth digits, in order to perform replace on the symbol values of the first to fourth digits, the replace rule of the index "6" is applied, and a replace rule symbol 302 corresponding to the index "6" is "20".

In a case where the symbol stream corresponding to one block of the transmission object information includes symbol values of an AABB pattern as second to fifth digits, in order to perform replace on the symbol values of the second to fifth digits, the replace rule of the index "7" is applied, and a replace rule symbol 302 corresponding to the index "7" is "21".

The replace rule of the index "8" is a replace rule representing that replace is not performed, and a replace rule symbol 302 corresponding thereto is "22".

In STEP S103, the encoding unit 110 determines which of the symbol sequences shown in FIG. 7 corresponds to the AAA pattern or the AABB pattern included in the symbol stream 300 corresponding to one block of the transmission object information, and selects the index of a replace rule corresponding to the determined symbol sequence.

Referring to FIG. 4 again, a description will be made. In a case where the symbol stream corresponding to one block of the transmission object information does not include an AAA pattern or an AABB pattern ("NO" in STEP S102), the encoding unit 110 selects the replace rule representing that replace is not performed (the replace rule of the index "8").

After the process of STEP S103 or STEP S104, in STEP S105, the encoding unit 110 performs conversion on the symbol stream 300 based on the selected replace rule.

FIG. 8 is a view illustrating examples of the contents of the replace rules. Information on the contents of the replace rules shown in FIG. 8 is stored in the memory 104 included in the transmission apparatus 100 and the memory 204 included in the reception apparatus 200. As shown in FIG. 8, the replace rules of the indexes "0" to "4" are for converting the AAA patterns into patterns (ABC patterns) which do not include any sequence of identical symbol values. For example, "000", "111", and "222" are converted into "012", "120", and "201", respectively. Also, the replace rules of the indexes "5" to "7" are for converting the AABB patterns into patterns (ABCB patterns or ACBC patterns) other than them. For example, "0011", "0022", "1100", "1122", "2200", and "2211" are converted into "0121", "0212", "1202", "1020", "2010", and "2101", respectively.

Figure 5:
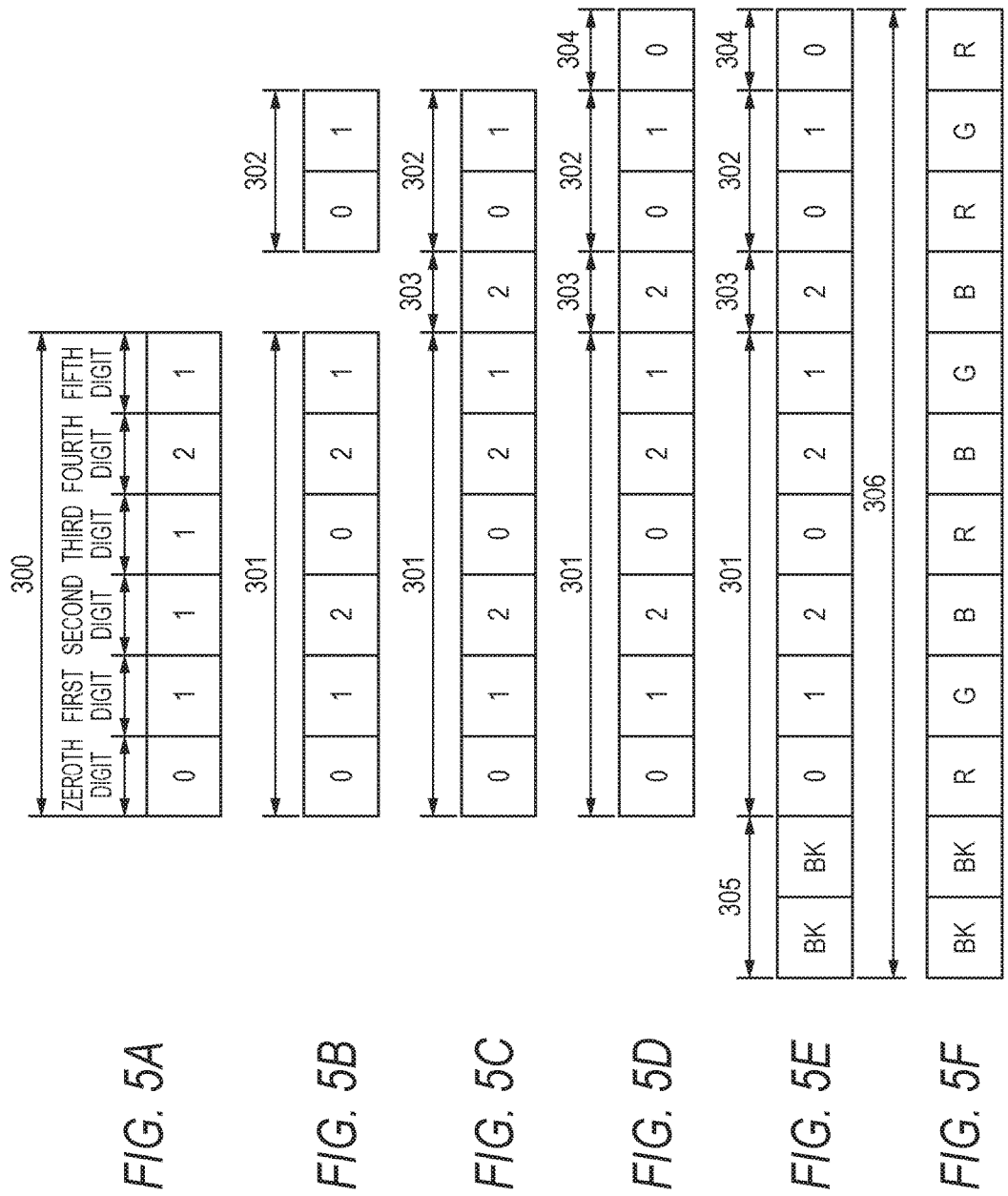
FIG. 5A is a view illustrating an example of a transmission symbol generating process and is a view illustrating a symbol stream 300 corresponding to one block of transmission object information.
FIG. 5B is a view illustrating a discontinuous symbol stream 301 which is generated in STEP S105 of FIG. 4 and a replace rule symbol 302.
FIG. 5C is a view illustrating a symbol stream obtained from the state of FIG. 5B by interposing a discontinuity guarantee symbol 303 between the discontinuous symbol stream 301 and the replace rule symbol 302.
FIG. 5D is a view illustrating a symbol stream obtained by adding a party symbol 304 to the state of FIG. 5C.
FIG. 5E is a view illustrating a symbol stream obtained by adding a header 305 to the state of FIG. 5D.
FIG. 5F is a view illustrating the state of FIG. 5E by the timings of the colors of lights which are emitted.

In a case where STEP S105 is performed after STEP S103, based on the replace rule content shown in FIG. 8 in association with one of the indexes "0" to "7" corresponding to the replace rule selected in STEP S103, the encoding unit 110 converts the AAA pattern or the AABB pattern included in the symbol stream 300 corresponding to one block of the transmission object information into a different pattern. By the process of STEP S105, a symbol stream (a discontinuous symbol stream) 301 which does not include any sequence of three or more identical symbol values, for example, as shown in FIG. 5B is generated from the symbol stream 300 corresponding to one block of the transmission object information.

Meanwhile, in a case where STEP S105 is performed after STEP S104, since the index of the replace rule selected in STEP S104 is "8", the encoding unit 110 does not perform conversion on the symbols.

Subsequently, in STEP S106, the encoding unit 110 adds a replace rule symbol 302, a discontinuity guarantee symbol 303, a parity symbol 304, and a header 305 to the discontinuous symbol stream 301, thereby generating a transmission symbol stream 306.

Specifically, the encoding unit 110 adds a replace rule symbol 302 corresponding to the replace rule selected in STEP S103 or STEP S104 to the discontinuous symbol stream 301. As a result, a symbol stream as shown in FIG. 5B is generated. Subsequently, the encoding unit 110 adds a discontinuity guarantee symbol 303 between the discontinuous symbol stream 301 and the replace rule symbol 302. At this time, the encoding unit 110 adds, as the discontinuity guarantee symbol 303, a symbol value different from the symbol value of the final digit of the discontinuous symbol stream 301 and the symbol value of the first digit of the replace rule symbol 302. As a result, a symbol stream as shown in FIG. 5C is generated. Subsequently, the encoding unit 110 adds a parity symbol 304 after the replace rule symbol 302. The parity symbol 304 is, for example, the value of the first digit of the sum of the individual symbol values of the discontinuous symbol stream 301, the replace rule symbol 302, and the discontinuity guarantee symbol 303. As a result, a symbol stream as shown in FIG. 5D is generated. Further, the encoding unit 110 adds a header (BK) 305 corresponding to two symbols in front of the discontinuous symbol stream 301. As a result, a transmission symbol stream 306 including a 10-digit symbol stream and the header (BK) 305 corresponding to two symbols as shown in FIG. 5E is finally generated.

Subsequently, the modulating unit 111 performs modulation based on the transmission symbol stream 306, thereby associating symbol values "0", symbol values "1", and symbol values "2" with red (R), green (G), and blue (B) lights, respectively. The driving unit 112 performs control such that the red (R), green (G), and blue (B) lights associated with the symbol values are changed over time. According to the control of the driving unit 112, in STEP S107, the transmission unit 114 outputs while changing the red (R), green (G), and blue (B) lights over time. For example, as shown in FIG. 5F, red (R) lights corresponding to symbol values "0", green (G) lights corresponding to symbol values "1", and blue (B) lights corresponding to symbol values "2" are output, and lighting off corresponding to the header is performed.

Figure 9:
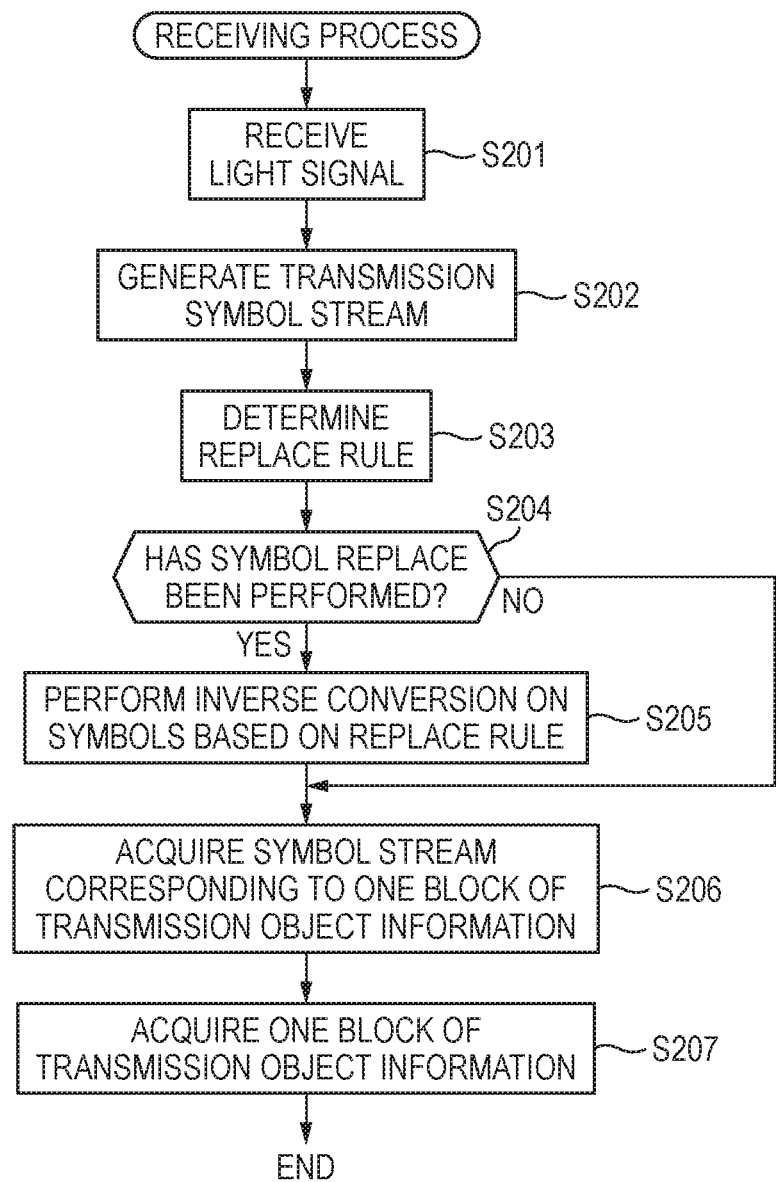
FIG. 9 is a flow chart illustrating operations of a receiving process of the reception apparatus.

FIG. 9 is a flow chart illustrating operations of the receiving process of the reception apparatus 200 according to the first embodiment. Also, it is assumed that the reception apparatus 200 has already recognized the configuration and replace rule of a transmission symbol stream to be generated by the transmission apparatus 100 by executing an application program for acquiring transmission object information. If a user of the reception apparatus 200 recognizes that the color of light of the transmission unit 114 included in the transmission apparatus 100 changes, the user activates the application program for acquiring transmission object information, and performs an operation to perform imaging. In response to the user's operation, in STEP S201, the imaging unit 214 included in the reception apparatus 200 images an imaging range including the transmission unit 114 of the transmission apparatus 100, thereby receiving a light signal.

Subsequently, in STEP S202, the decoding unit 234 included in the control unit 202 generates a transmission symbol stream 306 based on the received light signal. Subsequently, whenever an image signal is input from the imaging unit 214, the image generating unit 232 converts the corresponding image signal into digital data, thereby generating a frame. Further, the decoding unit 234 included in the control unit 202 searches the frame for change areas, and associates red (R) lights, green (G) lights, and blue (B) lights with symbol values "0", symbol values "1", and symbol values "2", respectively, and associates a header (BK) with lighting off, based on the hue values of the change areas, thereby generating a transmission symbol stream 306. Furthermore, the decoding unit 234 performs parity check based on the parity symbol 304 included in the transmission symbol stream 306, thereby determining whether there is any signal error. If there is no signal error, operations from STEP S203 to be described below are performed.

Subsequently, in STEP S203, the decoding unit 234 extracts a replace rule symbol 302 included in the transmission symbol stream 306, and determines a replace rule corresponding to the extracted replace rule symbol 302. Further, in STEP S204, the decoding unit 234 determines whether symbol replace has been performed in the transmission apparatus 100. Specifically, in a case where the index of the replace rule is any one of "0" to "7", the decoding unit 234 determines that symbol replace has been performed; whereas in a case where the index of the replace rule is "8", the decoding unit determines that symbol replace has not been performed.

In a case where symbol replace has been performed in the transmission apparatus 100 ("YES" in STEP S204), in STEP S205, the decoding unit 234 performs inverse conversion on the symbols based on the replace rule determined in STEP S203. Specifically, based on the replace rule determined in STEP S203, the decoding unit 234 specifies symbol positions where replace as shown in FIG. 7 has been performed. Further, the decoding unit 234 performs inverse conversion of the content of the replace rule shown in FIG. 8, on the replaced symbols. For example, according to the replace rules of the indexes "0" to "1", in a case where the symbols obtained by replace are "012", those symbols are inversely converted into "000", and in a case where the symbols obtained by replace are "120", those symbols are inversely converted into "111", and in a case where the symbols obtained by replace are "201", those symbols are inversely converted into "222". Also, according to the replace rules of the indexes "5" to "7", respectively, in a case where the symbols obtained by replace are "0121", those symbols are inversely converted into "0011", and in a case where the symbols obtained by replace are "0212", those symbols are inversely converted into "0022", and in a case where the symbols obtained by replace are "1202", those symbols are inversely converted into "1100", and in a case where the symbols obtained by replace are "1020", those symbols are inversely converted into "1122", and in a case where the symbols obtained by replace are "2010", those symbols are inversely converted into "2200", and in a case where the symbols obtained by replace are "2101", those symbols are inversely converted into "2211".

In a case where the result of the determination of STEP S204 is negative ("NO" in STEP S204, or after STEP S205, in STEP S206, the decoding unit 234 acquires a symbol stream 300 corresponding to one block of the transmission object information, from the transmission symbol stream obtained by the inverse conversion. Subsequently, in STEP S207, the decoding unit 234 acquires transmission object information corresponding to one block, from the symbol stream 300 corresponding to one block of the transmission object information.

As described above, in the information transmission system 1 according to the first embodiment, in a case where a symbol stream corresponding to one block of transmission object information includes an AAA pattern or an AABB pattern, the encoding unit 110 included in the transmission apparatus 100 selects a replace rule according to the mode of the sequence of identical symbol values, and performs conversion on the AAA pattern or the AABB pattern based on the selected replace rule, thereby generating a symbol stream (a discontinuous symbol stream) which dose not include any sequence of three or more identical symbol values. Further, the encoding unit 110 adds a replace rule symbol for specifying the replace symbols, a discontinuity guarantee symbol for guaranteeing discontinuity of the symbol values, and the like, thereby generating a transmission symbol stream.

Meanwhile, the decoding unit 234 included in the reception apparatus 200 determines the replace rule based on the replace rule symbol included in the transmission symbol stream, and performs inverse conversion on the symbols included in the discontinuous symbol stream, based on the determined replace rule, thereby acquiring the symbol stream subjected to the conversion of the transmission apparatus 100 and corresponding to one block of the transmission object information.

Since the transmission apparatus 100 converts symbols based on the replace rules as described above, three or more consecutive lights having the same color are prevented from being output, whereby color changes become drastic and it becomes easier for the reception apparatus 200 to specify candidates for the signal source. Also, since a replace rule is notified from the transmission apparatus 100 to the reception apparatus 200, the reception apparatus 200 can perform inverse conversion on symbols based on the replace rule, thereby acquiring a symbol stream corresponding to one block of information.

Also, in the first embodiment, since the number of replace rules is "8" which is a small number, it is not required to hold an immense amount of information on the occasion of replace, and thus it is possible to reduce storage capacities required for the memories 104 and 204, and to reduce the processing loads of the control units 102 and 202.

Now, an information transmission system according to a second embodiment of the present invention will be described. Similarly in the first embodiment, an information transmission system 1 according to the second embodiment is configured so as to include a transmission apparatus 100 and a reception apparatus 200 as shown in FIG. 1. Also, the transmission apparatus 100 has the same configuration as that shown in FIG. 2, and the reception apparatus 200 has the same configuration as that shown in FIG. 3. Therefore, hereinafter, differences from the first embodiment will be described.

The encoding unit 110 included in the control unit 102 of the transmission apparatus 100 uses an 8B6T encoding scheme to generate a 6-digit symbol stream having digits each of which is composed of one of the symbols of three values "0", "1", and "2" based on the ternary numeral system, from an 8-bit information item obtained by adding 2-bit information "00" to 6-bit information corresponding to one block of transmission object information. At this time, the encoding unit 110 permits a sequence of two symbols having identical values, but does not permit any sequence of three or more symbols having identical values, that is, the decoding unit generates the 6-digit symbol stream such that the symbol stream does not include any sequence of three or more symbols having identical values.

FIG. 10 is a view illustrating an example of a symbol stream conversion table which can be used in 8B6T encoding. Information on the symbol stream conversion table shown in FIG. 10 is retained, for example, in the memory 104, and represents the correspondence between 8-bit information items (left sections) which are expressed in hexadecimal notation and 6-digit symbol streams (right sections) into which the 8-bit information items of the left sections are converted. With reference to the symbol stream conversion table shown in FIG. 10, the encoding unit 110 generates a 6-digit symbol stream having digits each of which is composed of one of the symbols of three values "0", "1", and "2" based on the ternary numeral system, from an 8-bit information item obtained by adding 2-bit information "00" to 6-bit information corresponding to one block of the transmission object information. In this way, the encoding unit can convert sixty four 8-bit information items from "00" to "3F" into different 6-digit symbol streams, respectively, and can generate the 6-digit symbol streams such that those symbol streams do not include any sequence of three or more symbols having identical values.

Further, the encoding unit 110 generates a transmission symbol stream including a plurality of 6-digit symbol streams. FIG. 11A is a view illustrating an example of the transmission symbol stream. The encoding unit 110 generates payload 308 including a plurality of 6-digit symbol streams 300 and discontinuity guarantee symbols 303 being for guaranteeing discontinuity of three or more symbols having identical values and interposed between every two consecutive 6-digit symbol streams 300. Further, the encoding unit 110 adds a header 305, a sequence 307 of symbols of data taps and data lengths, and a discontinuity guarantee symbol 303 to the head part of the payload 308, and adds a discontinuity guarantee symbol 303 and a frame check sequence (FCS) 309 to the last part of the payload 308, thereby generating a transmission symbol stream. In a case of simply connecting two consecutive 6-digit symbol streams 300, since at most, four symbols having identical values can be sequenced, a discontinuity guarantee symbol is added, whereby it is guaranteed that three or more symbols having identical values are not sequenced.

The modulating unit 111 performs modulation based on each transmission symbol stream, thereby associating symbol values "0", symbol values "1", and symbol values "2" with red (R), green (G), and blue (B) lights, respectively. The driving unit 112 performs control such that the red (R), green (G), and blue (B) lights associated with the symbol values are changed over time. The transmission unit 114 is, for example, light emitting diodes (LEDs), and is controlled by the driving unit 112 such that it outputs while changing the red (R), green (G), and blue (B) lights over time. For example, with respect to the transmission symbol stream of FIG. 11A, light emission is performed in the mode of FIG. 11B.

Meanwhile, the decoding unit 234 included in the control unit 202 of the reception apparatus 200 searches frames input continuously in time series for portions (change areas) where hue changes occur. In a case where there is any change area, thereafter, whenever imaging is performed, the decoding unit 234 acquires the hue value of each change area included in a frame, and determines which of red (R), green (G), and blue (B) is the color of the change area corresponding to the acquired hue value. Further, the decoding unit 234 generates symbols corresponding to the determined red (R), green (G), and blue (B), and generates a transmission symbol stream which is a set of those symbols. The memory 204 retains information on the symbol stream conversion table and information on a transmission symbol stream format. Based on the information on the transmission symbol stream format, the decoding unit 234 extracts 6-digit symbol streams 300 included in each transmission symbol stream. Further, the decoding unit 234 performs inverse conversion on each 6-digit symbol stream 300 based on the information on the symbol stream conversion table, thereby acquiring a 6-bit information item corresponding to one block of the transmission object information.

As described above, in the information transmission system 1 according to the second embodiment, from each 8-bit information item obtained by adding 2-bit information "00" to 6-bit information corresponding to one block of transmission object information, the encoding unit 110 included in the transmission apparatus 100 generates a 6-digit symbol stream 300 which has digits each of which is composed of one of the symbols of three values "0", "1", and "2" based on the ternary numeral system and do not include any sequence of three or more symbols having identical values. Further, the encoding unit 110 generates transmission symbol streams each of which includes a plurality of 6-digit symbol streams. At this time, discontinuity guarantee symbols 303 are interposed between every two consecutive 6-digit symbol streams. As a result, the transmission symbol streams each of which includes the plurality of 6-digit symbol streams become transmittable, and since the discontinuity guarantee symbols 303 are added, it is guaranteed that three or more symbols having identical values are not sequenced.

Also, the present invention is not limited to the embodiments described above, and various modifications and applications are possible. For example, in the first embodiment described above, the replace rules shown in FIGS. 6 to 8 are used. However, the present invention is not limited thereto. Any other replace rules can be used as long as the reception apparatus can perform inverse conversion on symbols according to symbol conversion of the transmission apparatus 100, that is, as long as the uniqueness and reversibility of a conversion process are guaranteed.

Also, in the second embodiment described above, two symbols having identical values are permitted to be sequenced. However, two symbols having identical values may be prohibited from being sequenced. In this case, a symbol stream conversion table satisfying the condition that two symbols having identical values should be prohibited from being sequenced is prepared.

Also, the reception apparatus 200 may be any other communication apparatus as long as it can perform imaging and communication. For example, the reception apparatus may be a personal handy-phone system (PHS), a personal digital assistance or a personal data assistance (PDA), a tablet personal computer (PC), a game machine, a portable music reproduction apparatus, or the like.

Also, an apparatus having both of the function of the reception apparatus 200 and the function of the transmission apparatus 100 may be prepared such that both functions can be properly used according to places.

Also, in each embodiment described above, a system for performing the above described processes may be configured by storing executable programs in computer-readable recording media such as a flexible disc, a compact disc read-only memory (CD-ROM), a digital versatile disc (DVD), and a magneto-optical disc (MO) to be distributed and installing those programs.

Also, those programs may be stored in a disc device or the like included in a predetermined server on a network NW such as the Internet, and be downloaded, for example, by superposing the programs on carrier waves.

Also, in some cases such as a case where operating systems (OSs) share and implement the above described functions or a case where an OS and applications implement the above described functions in cooperation with one another, only the other part other than the OSs may be stored in media to be distributed, or may be downloaded.

Although the preferred embodiments of the present invention have been described above, the present invention is not limited to those specific embodiments, and inventions which are described in claims and equivalents thereof are included in the present invention.

What is claimed is:

1. An information transmission system which uses visible lights as transmission media, the information system comprising:
    a transmission apparatus; and
    a reception apparatus,
    wherein the transmission apparatus comprises:
        a generating unit that generates a multi-value symbol stream by using the visible lights as the transmission media;
        a first determining unit that determines whether the multi-value symbol stream includes a continuous symbol stream which is a symbol stream with a sequence of identical symbol values, a number of identical symbol values in the sequence being equal to or greater than a predetermined number; and
        a first control unit that performs control (i) to replace the continuous symbol stream with a discontinuous symbol stream according to a first replacement rule, when the first determining unit determines that the multi-value symbol stream includes the continuous symbol stream, the discontinuous symbol stream being a symbol stream without the sequence of identical symbol values, and (ii) not to change the multi-value symbol stream with the discontinuous symbol stream, when the first determining unit determines that the multi-value symbol stream does not include the continuous symbol stream, and
    wherein the reception apparatus comprises:
        an acquiring unit that acquires a symbol stream transmitted from the transmission apparatus;
        a second determining unit that determines whether the symbol stream acquired by the acquiring unit includes the discontinuous symbol stream; and
        a second control unit that performs control to replace the discontinuous symbol stream with the continuous symbol stream according to a second replacement rule, when the second determining unit determines that the acquired symbol stream includes the discontinuous symbol stream.

2. A symbol stream generating apparatus comprising:
    a generating unit that generates a multi-value symbol stream to be transmitted by using visible lights as transmission media;
    a determining unit that determines whether the multi-value symbol stream includes a continuous symbol stream which is a symbol stream with a sequence of identical symbol values, a number of identical symbol values in the sequence being equal to or greater than a predetermined number; and
    a control unit that performs control (i) to replace the continuous symbol stream with a discontinuous symbol stream according to a predetermined replacement rule, when the determining unit determines that the multi-value symbol stream includes the continuous symbol stream, the discontinuous symbol stream being a symbol stream without the sequence of identical symbol values, and (ii) not to change the multi-value symbol stream with the discontinuous symbol stream, when the determining unit determines that the multi-value symbol stream does not include the continuous symbol stream.

3. The symbol stream generating apparatus according to claim 2, wherein the continuous symbol stream includes a plurality of patterns, and the control unit replaces the continuous symbol stream with the discontinuous symbol stream based on replacement rules according to the plurality of patterns.

4. The symbol stream generating apparatus according to claim 3, further comprising:
a memory that stores the plurality of patterns and the replacement rules in association with each other.

5. The symbol stream generating apparatus according to claim 2, wherein the control unit adds replacement rule information to the discontinuous symbol stream.

6. The symbol stream generating apparatus according to claim 5, wherein the replacement rule information is a symbol stream having a predetermined length and indicating the replacement rule.

7. The symbol stream generating apparatus according to claim 2, wherein:
each symbol in the multi-value symbol stream is one of a plurality of colors,
hues of the plurality of colors are separated from each other at intervals of a distance, and
the symbol stream generating apparatus further comprises:
an output unit that outputs the symbol stream generated by the generating unit to an apparatus which emits lights of the plurality of colors.

8. A symbol stream generating method comprising:
generating a multi-value symbol stream to be transmitted by using visible lights as transmission media;
determining whether the multi-value symbol stream includes a continuous symbol stream which is a symbol stream with a sequence of identical symbol values, a number of identical symbol values in the sequence being equal to or greater than a predetermined number; and
performing control (i) to replace the generated continuous symbol stream to a discontinuous symbol stream according to a predetermined replacement rule, when it is determined that the multi-value symbol stream includes the continuous symbol stream, the discontinuous symbol stream being a symbol stream without the sequence of identical symbol values, and (ii) not to change the multi-value symbol stream with the discontinuous symbol stream when it is determined that the multi-value symbol stream does not include the continuous symbol stream.

9. A non-transitory computer readable storage medium storing a program for controlling a computer to perform operations including:
generating a multi-value symbol stream to be transmitted by using visible lights as transmission media;
determining whether the multi-value symbol stream includes a continuous symbol stream which is a symbol stream with a sequence of identical symbol values, a number of identical symbol values in the sequence being equal to or greater than a predetermined number; and
performing control to replace the generated continuous symbol stream with a discontinuous symbol stream according to a predetermined rule, the discontinuous symbol stream being a symbol stream without a sequence of identical symbol values, when it is determined that the multi-value symbol stream includes the continuous symbol stream, and (ii) not to change the multi-value symbol stream with the discontinuous symbol stream when it is determined that the multi-value symbol stream does not include the continuous symbol stream.

* * * * *